United States Patent [19]

Gerhardt

[11] 4,181,277

[45] Jan. 1, 1980

[54] VARIABLE SPAN WING

[75] Inventor: Heinz A. Gerhardt, Redondo Beach, Calif.

[73] Assignee: Northrop Corporation, Los Angeles, Calif.

[21] Appl. No.: 845,864

[22] Filed: Oct. 27, 1977

[51] Int. Cl.² .............................................. B64C 3/54
[52] U.S. Cl. ..................................... 244/218; 244/36
[58] Field of Search ................... 244/218, 215, 46, 36, 244/15, 49

[56] References Cited

U.S. PATENT DOCUMENTS

| 2,420,433 | 5/1947 | Kraaymes | 244/218 |
| 2,550,278 | 4/1951 | Makhonine | 244/215 |
| 2,858,091 | 10/1958 | Kapenkin | 244/218 |
| 3,092,355 | 6/1963 | Brown | 244/218 |

*Primary Examiner*—Barry L. Kelmachter
*Attorney, Agent, or Firm*—Willard M. Graham

[57] ABSTRACT

A variable span wing in which a movable wing segment is externally mounted to slide along the trailing edge of the stationary main wing. The movable wing segment is extended beyond the span of the main wing at subsonic flight and retracted to the same span at supersonic flight. Extension (or retraction) on one side only provides roll control. Retraction subsonic speeds is utilized to achieve improved ride qualities and a reduction in wing loads at high load factors.

3 Claims, 4 Drawing Figures

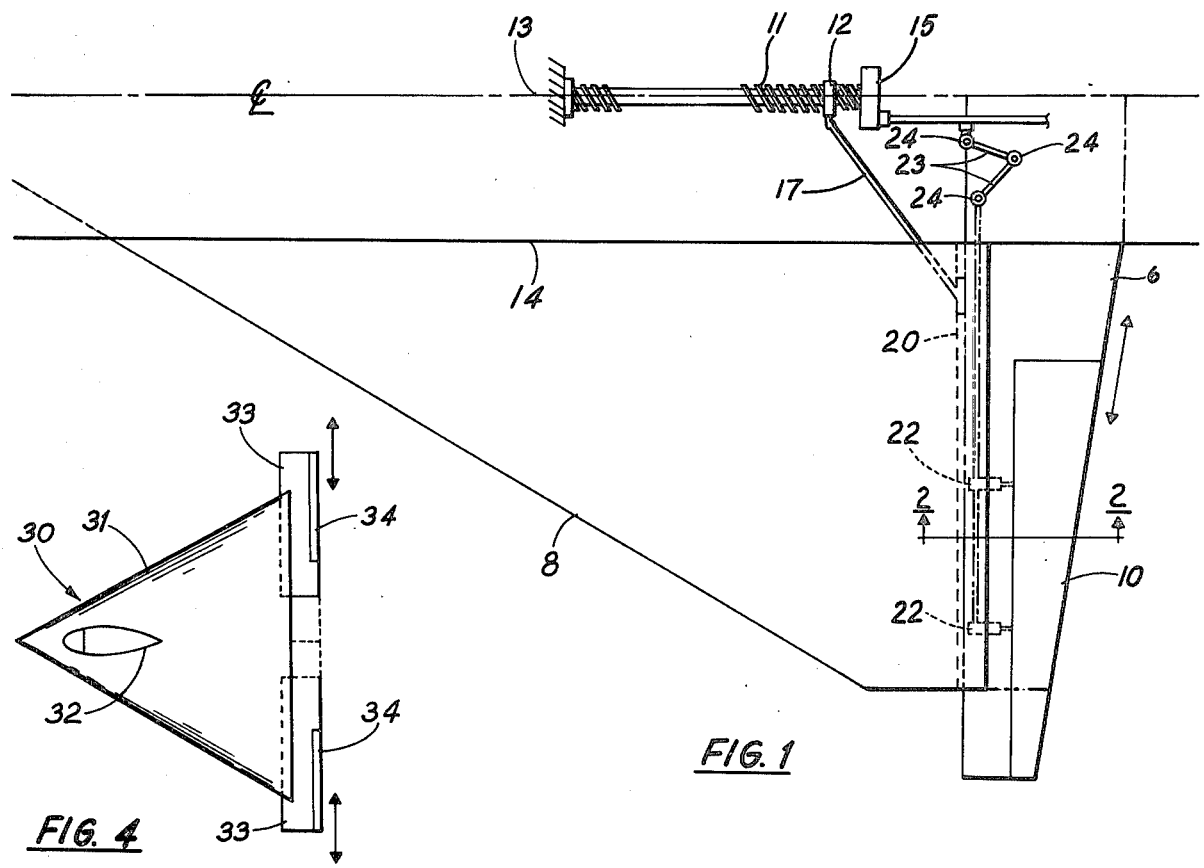
FIG. 1
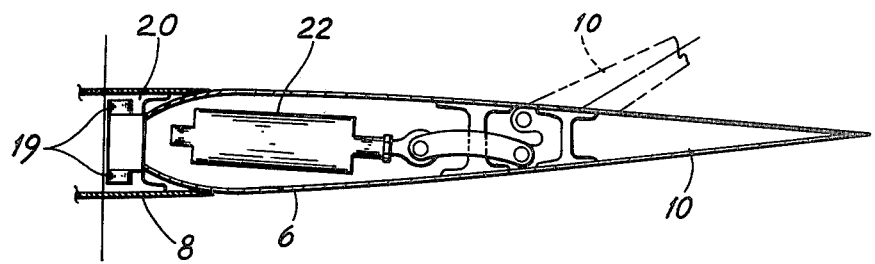
FIG. 2
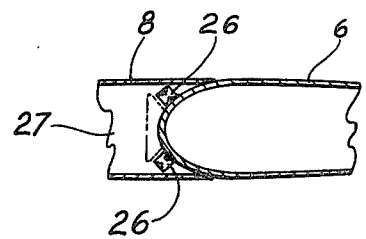
FIG. 3
FIG. 4

VARIABLE SPAN WING

BACKGROUND OF THE INVENTION

Modern aircraft capable of supersonic flight employ wings with highly swept leading edges because of the substantial reduction in wave drag that is possible therewith. However, on any given mission, current military aircraft are required to perform with maximum efficiency at supersonic and at subsonic speeds. The two flight regimes embody two conflicting wing design criteria. At supersonic speeds, flight occurs at relatively low lift coefficients and drag due to lift is less important than zero-lift drag. At subsonic speeds, on the other hand, drag at lift is of far greater significance, particularly at maneuvering flight and for efficient cruise. A large wing span is the fundamental way to achieve low drag due to lift, $D_L \sim 1/b^2$. For the drag due-to-lift term, it makes no difference whether the wing span increase is achieved by aspect ratio increase or wing area increase (wing loading decrease).

To provide an aircraft with the capability of performing efficiently at subsonic and at supersonic speeds, several current aircraft, notably the F-111 fighter-bomber and the B-1 bomber, employ variable-sweep wings. Variable-sweep wings are complex, expensive and impose severe weight penalties on the aircraft.

Since drag at lift is primarily a function of span, a variable-span wing solves the subsonic/supersonic speed incompatibility. However, a number of engineering problems must be solved before attempting to design a practicable variable-span wing. Particular attention must be paid to shaping that portion of the span extension assembly which extends beyond the main wing span, in order to achieve the full benefits of the extended span. The additional weight of the wing must not be excessive. Strength and rigidity of the main wing must not be diminished. No chordwise discontinuities along the trackline should exist either for extended or retracted span conditions.

As evidenced by the prior art cited herein, previous attempts to design a practicable variable-span wing fail to solve the problems on one or more of the conditions set forth above. So far as the applicant is aware, none of the variable-span wings disclosed in the prior art were actually reduced to practice in an aircraft.

It is therefore a principal object of my invention to provide a variable-span wing which satisfies substantially all of the criteria for an aircraft capable of flying efficiently at subsonic and supersonic speeds at cruise and maneuvering flight conditions, as well as achieving good performance characteristics in takeoff and landing maneuvers.

It is a further object of my invention to provide a variable-span wing that maintains the rigidity and strength of the main wing, does not impose excessive weight on the aircraft, and preserves the aerodynamic integrity and surface continuity of the wing.

It is another object of my invention to provide a variable span wing in which the extendable surface can be retracted or extended on one side only to provide roll control about the airplane's longitudinal axis.

It is an additional object of my invention to provide a variable-span wing in which the extendible surfaces retract automatically upon reaching a certain maneuvering load factor, in order to limit the flight loads on the wing, and thereby reducing structural weight.

It is a still further object of my invention to provide a variable-span wing in which the extendible surfaces remain retracted at subsonic speeds, in order to improve ride qualities at low altitudes.

It is still another object of my invention to provide a variable-span wing in which the dimensions of the extendible surfaces are such that the aerodynamic center of the airplane at subsonic speeds with the surface extended substantially coincides with the aerodynamic center at supersonic speeds with the surfaces retracted, in order to minimize trim drag in both flight regimes.

PRIOR ART STATEMENT

The following patents are cited herein as the closest prior art of which the applicant is aware:

United States Patents

| NUMBER | NAME | DATE |
|---|---|---|
| Group I | | |
| 1,627,191 | Martin | May 3, 1927 |
| 1,772,815 | Mandrich | Aug. 12, 1930 |
| 1,982,242 | Bellanca | Nov. 27, 1934 |
| 2,260,316 | Harris | Oct. 28, 1941 |
| 2,292,613 | Chapman | Aug. 11, 1942 |
| 2,249,729 | Fitzurka | July 22, 1941 |
| 2,294,367 | Fleming | Sept. 1, 1942 |
| 2,344,044 | Koch | March 14, 1944 |
| 2,420,433 | Kraaymes | May 13, 1947 |
| 2,487,465 | Murray, Sr. | Nov. 8, 1949 |
| 2,550,278 | Makhonine | April 24, 1951 |
| 3,497,163 | Wakefield | Feb. 24, 1970 |
| 3,844,508 | Gioia et al | Oct. 29, 1974 |
| Group II | | |
| 2,858,091 | Kapenkin | Oct. 28, 1958 |
| 3,086,730 | Crist | April 23, 1963 |
| 3,130,944 | Creasey et al | April 28, 1964 |
| 3,285,540 | Shao-Tang Lee | Nov. 15, 1966 |

All of the Group I patents have one feature in common, namely, the extendible wing sections are all telescopically mounted in the main wing. The telescopic design feature results in a very inefficient main wing structure due to the fact that the internal space required for an efficient structure is taken up by the extendible wing section. Attempts to reduce the thickness of the extendible surface to allow more space for main wing structure is counter productive, because now the structural efficiency of the extended surface is impaired. Difficulties arise in extending the surface due to extremely high friction forces encountered as the wing flexes under flight loads. On thin wings, characteristic of supersonic wing sections, the telescopic principle may become altogether impracticable.

The Group II patents disclose variable area features in which the wing is expanded chordwise, as in U.S. Pat. No. 3,285,540 (Lee), and chordwise as well as spanwise as in U.S. Pat. Nos. 2,858,901 (Kapenkin), 3,086,730 (Crist), 3,130,944 (Creasey, et al). Two of the latter patents, as with the Group I patents, disclose extendible wing sections based on the telescopic principle and are therefore subject to the disadvantages of the telescopic design outlined above. The other, U.S. Pat. No. 3,130,944 (Creasey, et al) describes a foldable design, but no mechanism for folding or deploying the extendible sections of the wing is either described or shown. The Applicant's invention, as described, shown, and claimed herein distinguishes over the prior art patents cited above by providing an extendible wing section that attaches solely to the trailing edge of the main wing, and is complementally shaped to the main wing so that aerodynamic continuity, chordwise as well as lengthwise, is maintained when the extendible wing section is retracted as well as extended.

While it is possible that more pertinent prior arts exists, the Applicant's search is believed to have been conducted with conscientious effort to locate and evaluate the best prior art available at the time the search was made, but it is not to be construed as a representation that no better prior art exists.

SUMMARY OF THE INVENTION

A laterally movable wing section is mounted on the trailing edge of a stationary main wing for extension beyond the tip of the main wing and retraction into the aircraft fuselage to vary the span, and thus the area, of the wing. The leading edge of the movable wing section, which is partially external to the main wing is supported by a series of spaced support castor or roller trucks which slide along a track defined in the interior of the main wing trailing edge. Rigidity between the main wing and wing section is maintained by sets of bolster rollers disposed at angles to the upper and lower surfaces of the rounded nose of the movable segment, the bolster rollers being in intimate contact with the surfaces to form a rigid connection between the main wing and movable wing segment. A trailing edge flap may be incorporated into the movable wing segment for improved high lift characteristics.

DESCRIPTION OF THE DRAWINGS

FIG. 1 is a partial plan view of an aircraft showing the main wing and movable wing segment and operating system therefor.

FIG. 2 is a cross-sectional view taken on lines 3—3 showing details of the operating system.

FIG. 3 is a partial cross-sectional view taken on lines 4—4 showing an example of bolster rollers for imparting rigidity to the wing combination.

FIG. 4 is a simplified plan view of a tailless aircraft provided the extendible wings of the present invention.

DESCRIPTION OF THE PREFERRED EMBODIMENT

As shown in FIG. 1, in a preferred embodiment thereof, an extendible wing segment 6 is mounted on the trailing edge of a stationary highly swept main wing 8, the wing segment 6 being partially external to the main wing 8. It will be understood that both wings on the aircraft are identically equipped with the movable wing segment 6 illustrated in the Figure. The inboard end of the extendible wing segment 6 extends into the aircraft fuselage 9 in its retracted position, being slidably movable from its retracted position to extend beyond the tip of the stationary main wing 8 substantially as shown. The nose section of the movable wing segment is shaped to blend with the trailing edge of the main wing so that the aerodynamic integrity and surface continuity is preserved. A partial span trailing edge flap 10 is mounted on the trailing edge of the extendible wing segment 6.

Lateral movement, i.e., extension and retraction of the extendible wing segment 6 is accomplished by a single screwjack 11 with traveling nut 12 mounted to structure 13 located on the aircraft fuselage 14 centerline above the wing. The rotating screwjack is operated by hydraulic motor powered by a source of hydraulic fluid (not shown) driving through a common gearbox 15.

Each extendible wing segment 6 is connected to the traveling nut 12 by a push rod 17 which translates the rotary motion of traveling nut 12 to linear spanwise thrust for extension and retraction of the wing segment 6 along a track 18 by a series trucks with rollers 19 mounted on the leading edge of the wing segment 6, the track being defined in an enclosed member 20 built into the trailing edge of main wing 6 somewhat as shown in FIG. 2. Vertical shear and chordwise bending moments are transmitted, and hence reacted to, through the track 20 and roller 19 interface. The series of trucks 19 ensures that the extendible wing segment 6 and main wing 8 will deflect together under spanwise bending deflections, minimizing surfaces discontinuities, i.e., structural steps and gaps in the airstream.

As shown in FIG. 3, rigidity between the main wing 8 and the extendible wing segment 6 can be bolstered by mounting pairs of angularly disposed rollers 26 journeled in a bracket 27 provided in the trailing edge of the main wing 8, with the rollers 26 in firm contact with the upper and lower surfaces of the leading edge or nose of the extendible wing 6.

Torque for operation of each trailing edge flap 10 is provided through one or more conventional hydraulic actuators 22 mounted in the extendible wing segment 6, and controlled in the usual manner. The hydraulic actuators 22 are supplied by a source of hydraulic fluid (not shown) through supply lines 23 interconnected through swivel joints 24 movable in the usual manner as the extendible wing segment 6 is slidably extended and retracted along the trailing edge of the stationary main wing 8.

In the particular example of the variable span wing of my invention shown in the Figures, the wing span is increased by 25% which, according to lifting surface program calculations reduces drag-due-to-lift ($1/b^2$) to 64% of the original wing.

While I have described and shown a preferred embodiment of the variable span wing of my invention applied to a conventional aircraft, the invention is also suitable for use in so-called flying wing or tailless aircraft. A tailless aircraft 30, as shown in the simplified drawing of FIG. 4, includes the wing 31 and a cockpit 32 incorporated into the wing 31, with extendible wing segments 33 mounted on the trailing edge of the main wing and operated in the same manner as in the conventional aircraft of FIG. 1. When the segments 33 are retracted the inner ends nearly abut at the aircraft center line. In the extended positions, there will be a gap between the inner ends of the segments 33.

Flap or flaperons 34 are provided in the extendible wing segments 33, operating in the conventional manner.

The described mechanism is but one mechanical means embodied in the variable span wing of my invention. Alternate means employing, for instance, hydraulic power for spanwise extension and retraction utilizing established engineering principles in such a design are feasible. Also, airloads of the trailing edge assembly need not necessarily be transmitted as bending loads across the trackline, but could be transmitted as torsional loads directly into the fuselage via the root rib of the extension assembly. Only shear loads remain then to be transmitted across the trackline resulting in a possible structural weight saving.

I claim:

1. In combination with an aircraft having stationary main wings and a fuselage, partially external movable wing segments mounted on the trailing edges of said main wings, said wing segments being slidably movable along the outer portion of the main wing trailing edges from positions wherein the inboard ends thereof are recessed within said fuselage with the outboard ends thereof coterminus with the tips of said main wings, to positions wherein the inboard ends thereof are extended out of said fuselage with the outboard ends extending beyond the tips of said main wings, power means for extending and retracting said wing segments, trailing edge flaps movably mounted on the trailing edges of said movable wing segments, and power means for operating said flaps.

2. In combination with an aircraft having stationary main wings, means for varying the span of said main wings, comprising partially external wing segments mounted on the trailing edge of each of said main wings, said wing segments being slidably movable along the outer portion of the main wing trailing edge from positions wherein the inboard ends thereof are recessed within the fuselage of said aircraft with the outboard ends thereof substantially coterminus with the tips of said main wings, to positions wherein the inboard ends of said movable wing segments are extended out of said fuselage with the outboard ends thereof extending beyond the tips of said main wings, and power means for extending and retracting said wing segments.

3. In combination with a tailless aircraft having main wings, movable wing segments mounted for lateral movement along the trailing edges of said main wings, said wing segments being movable from positions wherein the inboard portions thereof abut at the centerline of the aircraft with the outboard portions thereof coterminus with the tips of said main wings, to positions wherein the outboard portions thereof are extended beyond the tips of said main wings with the inboard portions following the same movement leaving a gap between themselves, and power means for extending and retracting said wing segments, trailing edge flaps movably mounted on the trailing edges of said movable wing segments, and power means for operating said flaps.

* * * * *